United States Patent [19]
Iida et al.

[11] 3,934,321
[45] Jan. 27, 1976

[54] ROTOR HOUSING FOR A ROTARY PISTON TYPE ENGINE AND METHOD FOR MANUFACTURING THE SAME

[75] Inventors: Hirotaka Iida; Hiroshi Masaoka; Michinobu Yamada; Mutsuo Ichihara; Yoshitaka Uebayashi; Koji Tashiro; Sadao Taketomo, all of Hiroshima, Japan

[73] Assignee: Toyo Kogyo Co., Ltd., Hiroshima, Japan

[22] Filed: Apr. 9, 1974

[21] Appl. No.: 459,329

[30] Foreign Application Priority Data
Apr. 10, 1973 Japan.............................. 48-40580
Apr. 11, 1973 Japan.............................. 48-41639

[52] U.S. Cl........ 29/156.4 WL; 418/178; 29/527.5; 164/98; 164/112
[51] Int. Cl.².......................................... B23P 15/00
[58] Field of Search ..... 29/156.4 WL, 527.1, 527.5; 418/178, 179; 123/193 C; 92/169; 164/98, 112, 113

[56] References Cited
UNITED STATES PATENTS

| | | |
|---|---|---|
| 2,062,394 | 12/1936 | Brown.............................. 123/193 C |
| 3,069,209 | 12/1962 | Bauer.................................. 92/169 |
| 3,153,990 | 10/1964 | Kunzog....................... 29/156.4 WL |
| 3,165,983 | 1/1965 | Thomas.......................... 123/193 C |
| 3,239,135 | 3/1966 | Fritz................................. 418/178 |
| 3,313,239 | 4/1967 | Brunson et al..................... 418/179 |

FOREIGN PATENTS OR APPLICATIONS
1,963,981 12/1969 Germany........................... 418/178

OTHER PUBLICATIONS
Metals Handbook, 8th Edition, *Welding and Brazing*, Vol. 6, American Society for Metals, 1971, p. 504.

*Primary Examiner*—C. W. Lanham
*Assistant Examiner*—Dan C. Crane
*Attorney, Agent, or Firm*—Fleit & Jacobson

[57] ABSTRACT

Rotor housing for a rotary piston type engine comprising a liner made of a metal sheet having one surface formed with teeth-like projections, said liner being formed into a trochoidal configuration with said one surface directed outside, and an aluminum based metal housing substrate cast around the liner whereby firm bonding is assured between the liner and the housing substrate due to the existence of the projections. Novel method for manufacting such a rotor housing is also disclosed.

6 Claims, 18 Drawing Figures

ROTOR HOUSING FOR A ROTARY PISTON TYPE ENGINE AND METHOD FOR MANUFACTURING THE SAME

The present invention relates to a rotor housing for a rotary piston type internal combustion engine and a method for manufacturing such a rotor housing. More particularly, the present invention relates to a rotor housing comprising a rolled metal plate liner and an aluminum based cast metal substrate surrounding the liner.

It has been recognized that a rotor housing of a rotary piston type internal combustion engine is subjected at its sliding surface to high temperature gas so that a substantial thermal load is applied thereto. Further, since a rotor is moved in a planetary revolving motion in the rotor housing, the rotor housing is subjected to cyclic shock load so that the housing material must be of a shock resistant property. It is further required that the rotor housing have a wear resistant sliding surface because apex seals on the rotor slidably move thereon.

Thus, it has been proposed to cast a rotor housing substrate by a material having a high heat conductive property, such as aluminum alloy, and then provide a hard plated layer such as by chromium plating on the inner surface of the housing substrate.

In fact, there has been proposed to form a hard layer by directly plating chromium on the cast aluminum alloy substrate. However, it has been experienced that the plated layer thus formed is often peeled off when it is subjected to cyclic shock load from the rotor. Internal defects such as blow holes and/or pin holes in the casted aluminium alloy substrate locally reduce heat conductivity of the substrate possibly causing peeling-off of the plated layer. Further, the plated layer may have cracks which may be a cause of corrosion. The direct plating method is further disadvantageous in that it requires complicated pre-treatments in order to secure a satisfactory bonding of the plated layer to the substrate.

It has also been proposed to provide a compound nickel plating directly on the cast aluminum alloy substrate. However, this method has disadvantages as in the aforementioned method since the housing substrate is made of aluminum alloy. Further, carbides such as SiC are educed during nickel plating and these carbides make machining of the housing inner surface very difficult. Since the amount of educed SiC affects the amount of wear of a sliding member which slidably moves on the plated surface, it is important to control the amount of SiC, however, such a control has been considered as being very difficult. Further, as far as the plating process is concerned, a complicated process is required to supply nickel ion to the plating bath and to maintain the anode.

Another known method is to provide a plated layer of a hard material, such as chromium on the inner surface of the cast aluminum alloy substrate with the intervention of a sprayed metal layer therebetween. However, an additional step is required in spraying the metal and further it is difficult to perform quality control.

There has also been proposed to provide a cast iron liner having rough surfaces, then cast aluminum alloy around the liner to form a housing substrate and then provide a chromium plated layer on the inner surface of the cast iron liner. The liner provides a sufficient bonding of the plated chromium layer, and in order to provide satisfactory rough surfaces, a centrifugal casting process may be employed in providing the cast iron liner. This method is disadvantageous, however, in that it is limited to a use of a cast material such as a cast iron in providing the liner. Further, the method cannot provide a higher production rate. When a centrifugal casting process is employed, the method can only produce a cylindrical liner so that it cannot be applied to a manufacture of a rotor housing for a rotary piston type engine.

Therefore, the present invention has an object to eliminate the aforementioned disadvantages of the known methods.

Another object of the present invention is to provide a novel construction of a rotor housing which can be readily manufactured.

A further object of the present invention is to provide a rotor housing for a rotary piston type engine having an inner plated layer which is substantially free from any breakage.

Still further object of the present invention is to provide a method for manufacturing such a rotor housing of novel construction.

According to the present invention, the above and other objects can be achieved by a rotor housing for a rotary piston type engine, comprising a liner provided by a rolled metal sheet which is scratched at one side to form a rough surface and has opposite terminal edges welded together to form a trochoidal configuration with said rough surface directed outside, and an aluminum based metal housing substrate cast around the liner, said welded terminal edges of the metal sheet being disposed within cold zone of the housing. Preferably, the liner is made of a steel plate and a plated layer of hard metal such as chromium may be provided on the inner surface of the liner.

According to a further aspect of the present invention, there is provided a method for manufacturing a rotor housing, comprising steps of providing a rolled metal sheet, scratching one side of said metal sheet to provide a rough surface, welding opposite terminal edges of said metal sheet together with said rough surface directed outside, forming said welded metal sheet into a trochoidal configuration to provide a liner with the welded edges disposed within cold zone of the completed housing, and casting under pressure an aluminum based material around said liner to form a housing substrate. According to a preferred mode of the present invention, the liner is formed into a trochoidal configuration having a major axis longer than that of a nominal trochoidal configuration which is larger than a desired trochoidal configuration of the rotor housing by an average shrink of the housing during manufacturing, and a minor axis shorter than that of the nominal trochoidal configuration. After casting the housing substrate, the liner is brought into the desired trochoidal configuration during cooling process of the housing The above and other objects and features of the present invention will become apparent from the following descriptions of the preferred embodiments taking reference to the accompanying drawings, in which:

FIG. 1 is a perspective view of a rotor housing in accordance with the present invention;

FIG. 2 diagrammatically shows a portion of the apparatus for carrying out a process for preparing a sheet metal liner of trochoidal configuration;

Figure 1:
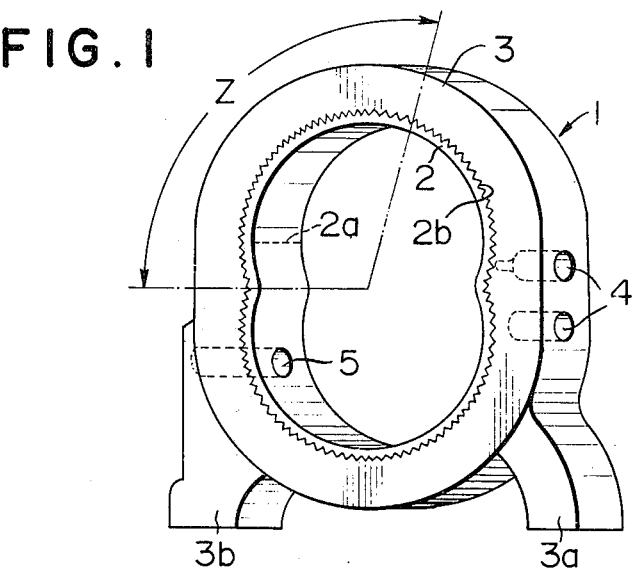
Figure 11:
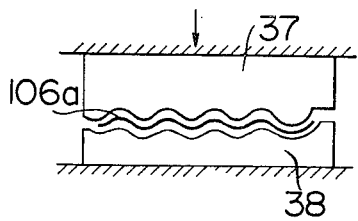
Figure 12:
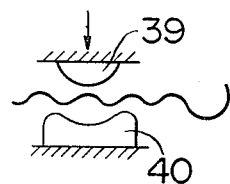
Figure 13:
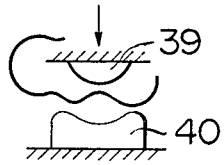
Figure 14:
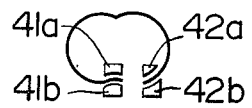
Figure 15:
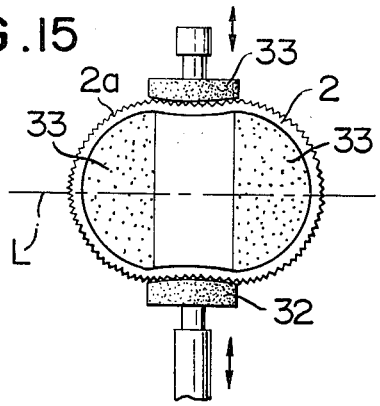
Figure 16:
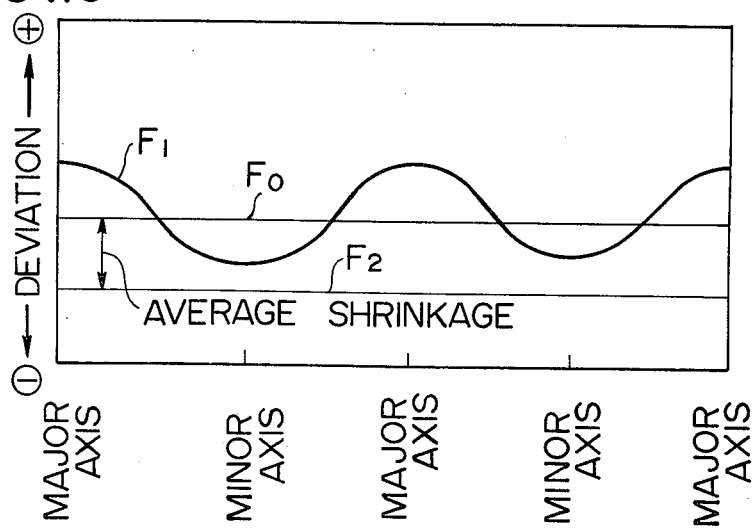
Figure 17:
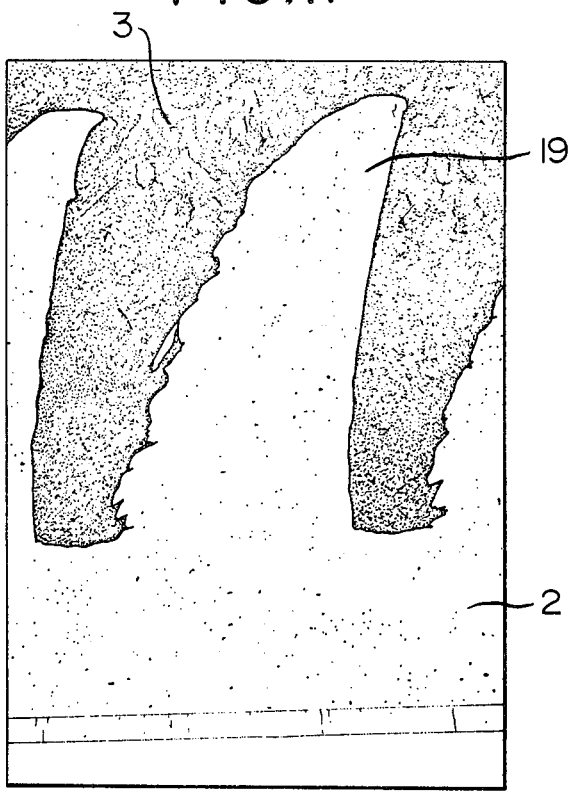
Figure 18:
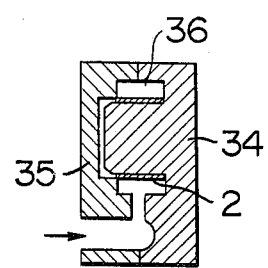

FIG. 11 diagrammatically shows one step of another process for forming a trochoidal sheet metal liner;

FIG. 12 shows a further step in the embodiment of FIG. 11;

FIG. 13 shows a further step in the embodiment of FIG. 11;

FIG. 14 shows a further step in the embodiment of FIG. 11;

FIG. 15 is a view showing a step of forming a trochoidal sheet metal liner which is deviated from a desired trochoidal configuration; and FIG. 16 is a diagram showing the deviation of the trochoidal configuration of the sheet metal liner from the desired trochoidal configuration;

FIG. 17 is an enlarged sectional view showing a section of a scratched rough surface on the metal sheet;

FIG. 18 is a sectional view of a die assembly for moulding a housing substrate around the sheet metal liner;

Referring now to the drawings, particularly to FiG. 1, there is shown in perspective view a rotor housing 1 made in accordance with the present invention. The rotor housing 1 comprises an inner liner 2 which is made of a sheet metal such as a steel plate which has opposite terminal edges welded together as shown by 2a in FIG. 1. The liner 2 is formed into a trochoidal configuration and has a rough outer surface 2b which is prepared by scratching the surface. Around the liner 2, there is formed a housing substrate 3 which is provided by aluminum or its alloy through a well known die-cast process. The housing is formed with ignition plug holes 4 and an exhaust port 5 as is well known in the art. Further, the housing substrate has legs 3a and 3b integrally formed therewith. In FIG. 1, the area Z shows a cold zone where the temperature is substantially lower than in the other zones. It should be noted that the edge welding portion 2a of the liner 2 is disposed in the cold zone Z.

Figure 2:
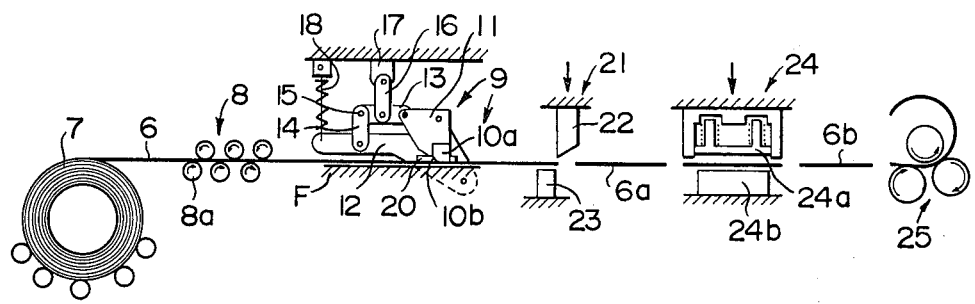

Referring now to FIG. 2, there is shown a process for forming a trochoidal sheet metal liner 2. A sheet metal web 6 is drawn from a roll 7 and passed through a straightening device 8 including a plurality of rolls 8a into a scratching mechanism 9. The mechanism 9 includes a plurality of scratching edges 10a and 10b which are arranged in two rows in staggered relationship. The scratching edges 10a and 10b are carried by a bracket 11 which is pivotally supported on a stationary frame F. The bracket 11 and the arm 12 are respectively connected with ends of links 13 and 14 which are in turn connected together at 15. The link 13 is connected through a third link 16 with a vertically movable press member 17. The reference numeral 18 designates a return spring. When the press member 17 is moved downwardly as shown by an arrow, the scratching edges 10a and 10b bite into the upper surface of the web 6 so as to provide a plurality of saw-teeth like projections 19 (FIG. 17) disposed in staggered relation with each other on the surface of the liner 2 to provide a rough surface 2b. The mechanism 9 further includes a holding member 20 carried on a swingable arm 12 on the frame F for holding the sheet metal web 6 stationary when the scratching mechanism 9 is in operation.

Figure 3:
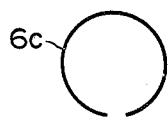
FIG. 3 shows another step in the process of the invention.

Next to the scratching mechanism 9, there is provided a cutting device 21 including a movable cutting blade 22 and a stationary blade 23. The cutting device 21 severs the sheet metal web 6 into a sheet 6a of a suitable length. Then, the sheet 6a is passed into a punching die assembly 24 in which the sheet 6a is punched into a desired shape by means of an upper and a lower dies 24a, 24b to form a blank 6b. Therefore, the blank 6b is passed through a forming roller assembly 25 in which it is formed into a circular configuration as shown by 6c in FIG. 3.

Figure 4:
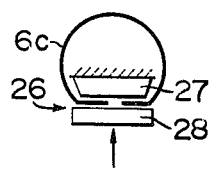
FIG. 4 shows a further step in the process of the invention.
Figure 5:
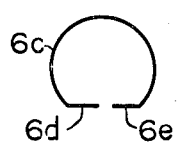
FIG. 5 shows a further step in the process of the invention.
Figure 6:
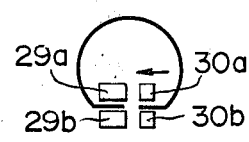
FIG. 6 shows a further step in the process of the invention.
Figure 8:
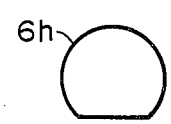
FIG. 8 shows a further step in the process of the invention.

The circular sheet metal blank 6c is then introduced into an edge flattening press assembly 26 including an upper press member 27 and a lower press member 28 as shown in FIG. 4, whereby the opposite terminal edges 6d and 6e flush of the blank 6c are flattened as shown in FIG. 5. The flattened edges 6d and 6e are then gripped by pairs of electrodes 29a, 29b and 30a, 30b respectively, and thereafter the movable pair of electrodes 30a and 30b are moved as shown by an arrow in FIG. 6 until the edge 6e of the blank 6c is brought into contact with the opposite edge 6d and welded thereto in the manner of a fllush butt welding so as to obtain a substantially cylindrical part 6f with a welding burr 6g at the welded portion. Then, the burr 6g is removed by suitable means to obtain a sheet metal part 6h as shown in FIG. 8.

Figure 9:
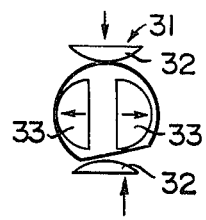
FIG. 9 shows a further step in the process of the invention.
Figure 10:
FIG. 10 shows a further step in the process of the invention.

The sheet metal part 6h is then introduced into a liner former 31 comprising a pair of opposed outer dies 32 and a pair of opposed inner dies 33 as shown in FIG. 9, and formed into a trochoidal configuration as shown in FIG. 10. Thus, a trochoidal sheet metal liner 2 can be obtained. Care must of course be taken so that the welded portion of the liner 2 is disposed in the cold zone Z of the completed rotor housing. The liner 2 is then pre-treated by for example washing, steam degreasing, sand blasting, or the like and placed in a male die 34 of a moulding die assembly and a female die 35 is placed against the male die 34 to define a moulding cavity 36 around the liner 2 (FIG. 18). Molten metal such as aluminum alloy is then introduced under pressure into the cavity 36 of the moulding die assembly and, after cooling, a rotor housing 1 as shown in FIG. 1 can be obtained. As previously described, a suitable metal such as chromium may be plated on the inner surface of the liner 2 when desired.

FIGS. 11-14 show an alternative method for forming a trochoidal sheet metal liner 2. As shown in FIG. 11, a sheet metal blank 106a is formed into a waved configuration by a complementary forming dies 37 and 38. Then, the blank 106a is formed by dies 39 and 40 as shown in FIGS. 12 and 13 into a substantially trochoidal configuration. Thereafter the opposite edges of the blank is gripped by pairs of electrodes 41a, 41b and 42a, 42b, respectively, and welded together.

Figure 7:
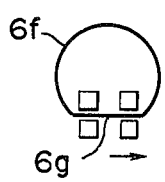
FIG. 7 shows a further step in the process of the invention.

It has been found that when the housing substrate is moulded the housing shrinks during cooling step in the direction of major axis of the trochoidal configuration in a greater extent than in the other directions due to the existence of cooling water passages in the housing and the leg portion 3a and 3b, with the result that the housing is rather bulged out in the direction of the minor axis of the trochoidal configuration. Thus, in forming the liner 2, this tendency of deformation should preferably be taken into account. FIG. 15 shows a trochoid forming step similar to that shown in FIG. 9. The major axis L of the trochoid is made greater than that of a nominal trochoid which is larger than a desired trochoidal configuration by an average shrinkage of the housing during manufacture while the minor axis l is smaller than that of the nominal configuration. FIG. 7 shows the deviation $F_1$ of the trochoidal configuration of the liner 2 from the nominal configuration $F_0$. $F_2$ shows a desired configuration. By forming the liner 2 with this deviation, it is possible to obtain a desired trochoidal configuration after cooling of the housing, so that it is possible to reduce the amount of machining of the liner surface after the moulding process.

According to the present invention, since the cast aluminum based metal housing substrate is bonded to the outer surface of the liner through a plurality of saw teeth like projections and any cracks which may be present in the liner are filled by the aluminum based metal during moulding process, it is possible to obtain a substantially improved bonding strength between the liner and the housing substrate. The staggered arrangement of the scratching edges is effective to eliminate any direction characteristics in the bonding strength between the liner and the substrate. The liner itself and the boundary area between the liner and the substrate can be free from any oxides which may have adverse effect on the heat conductive property of the housing. Further, the saw teeth like projections improves the heat transfer from the liner to the substrate. When the liner is made of a steel plate, a metal plating can be made thereon as desired without any particular pretreatment. Since the liner can be made of a material such as a steel plate which has a substantial thermal fatigue resistance, it is possible to eliminate a thermal fatigue failure of the housing in the vicinity of ignition plug hole as experienced in a rotor housing having a plated layer directly formed on the housing substrate. By disposing the welded portion of the liner in the cold zone of the rotor housing, it is possible to prevent the relatively weak bonding strength between the liner and the substrate around the welded portion from having an adverse effect on the durability of the housing. It is preferable that the welded portion of the liner is disposed as close as possible within the cold zone to the minor axis of trochoid since such an arrangement is effective to move the welded portion apart from the core of the substrate moulding die whereby any damage on the moulding die by the welded portion of the liner during removal of the moulded part from the die.

The invention has thus been shown and described with reference to particular embodiments, however, it should be noted that the invention is in no way limited to the details of the illustrated embodiments and changes and modifications may be made within the scope of the appended claims.

We claim:

1. Method for manufacturing a rotor housing for a rotary piston type engine having a rotor housing liner with a cold zone located substantially opposite an ignition plug opening, comprising steps of providing a rolled metal sheet, scratching one side of said metal sheet to provide a rough surface, welding opposite terminal edges of said metal sheet together with said rough surface directed outside, forming said metal sheet into a trochoidal configuration to provide a liner with the welded edges disposed within a cold zone of the completed housing, and casting under pressure an aluminum based material around said liner with terminal edges welded to form a housing substrate.

2. Method in accordance with claim 1 in which the liner is formed into a trochoidal configuration having a major axis longer than that of a nominal trochoidal configuration which is larger than a desired configuration of the rotor housing by an average shrinkage during manufacture of the housing, and a minor axis shorter than that of the nominal trochoidal configuration.

3. Method in accordance with claim 1 in which a plurality of saw-teeth like projections are formed to provide the rough surface by the scratching step.

4. Method in accordance with claim 1 in which a plurality of saw-teeth like projections are formed in staggered relationship with each other on said one side of the metal sheet to provide said rough surface by the scratching step.

5. Method in accordance with claim 1 in which said metal sheet is formed into a circular configuration with said edges flattened prior to the welding step.

6. Method in accordance with claim 1 in which said metal sheet is formed into a trochoidal configuration before the edges are welded together.

* * * * *